R. M. PERRY.
FENDER.
APPLICATION FILED MAR. 3, 1917.

1,249,475.

Patented Dec. 11, 1917.

Inventor
Rufus M. Perry
By
Attorneys

UNITED STATES PATENT OFFICE.

RUFUS M. PERRY, OF FYFFE, ALABAMA.

FENDER.

1,249,475.  Specification of Letters Patent.  Patented Dec. 11, 1917.

Application filed March 3, 1917.  Serial No. 152,305.

*To all whom it may concern:*

Be it known that I, RUFUS M. PERRY, a citizen of the United States, residing at Fyffe, in the county of Dekalb and State of Alabama, have invented new and useful Improvements in Fenders, of which the following is a specification.

This invention relates to fenders used in connection with fireplaces to screen or guard the fireplace opening, and its object is to provide a novel and improved device of this kind which affords complete protection, and which, at the same time, permits ready access to the fireplace for replenishing the fuel supply.

The object stated is attained by means of a combination and arrangement of parts to be hereinafter described and claimed, and in order that the same may be better understood, reference is had to the accompanying drawing forming a part of this specification.

Figure 1:
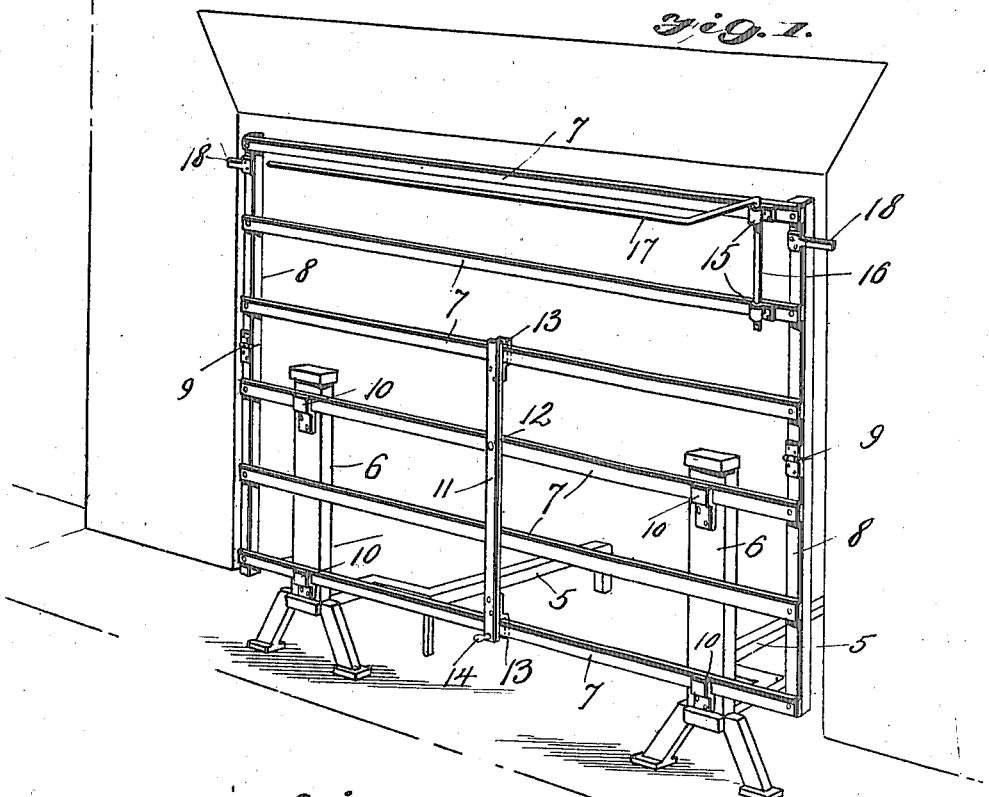
Figure 2:
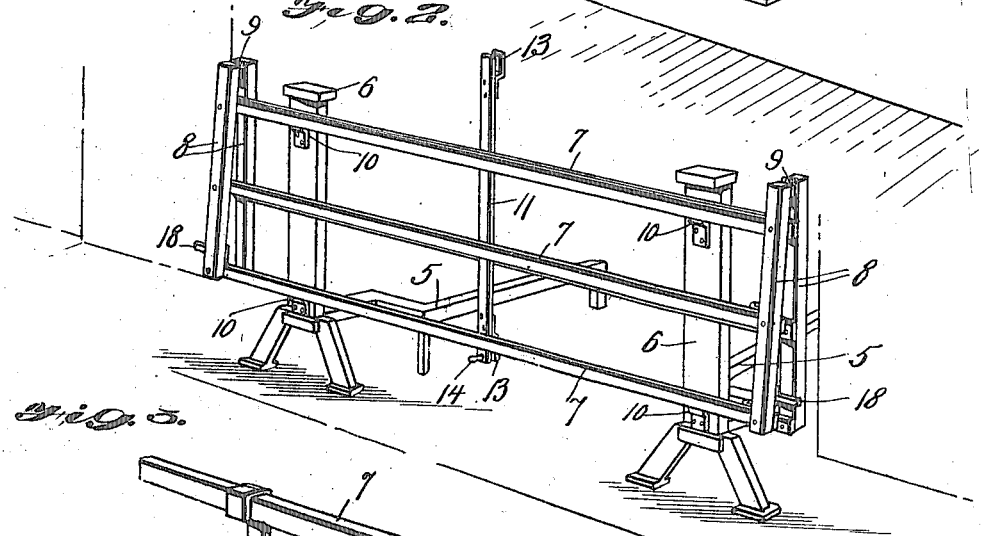
Figure 3:
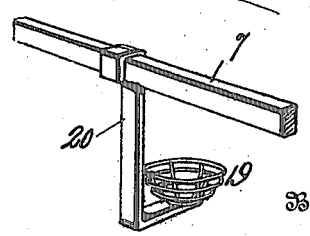

In the drawing, Figure 1 is a perspective view showing the fender set up in place; Fig. 2 is a similar view showing the fender folded, and Fig. 3 is a perspective view of a kettle support.

Referring specifically to the drawing, 5 denotes a pair of andirons of conventional form having the usual upstanding guard arms 6 at their forward ends. Associated with the arms 6 is a fender composed of a rectangular frame made up of cross bars 7 and end bars 8. This frame is made in two sections, the hinge connection being at the bars 8, and shown at 9. The fender is supported by clips 10 mounted on the arms 6 and so positioned that the top and bottom cross bars of the lower section of the fender seat in said clips, leaving the upper section of the fender rising above the level of the top of the arms 6 so as to extend to the top of the fireplace, as shown in Fig. 1, and as the bottom section of the fender extends down to within a short distance from the floor, the fireplace opening is completely covered, and the fender therefore effectually serves as a fire guard or screen.

The two sections of the fender are held in extended position by a latch device comprising a bar 11 pivoted intermediate its ends, as shown at 12, to the top cross bar of the lower fender section and having hooks 13 at its ends, one of said hooks being designed to slip over the bottom cross car of the upper fender section, and the other hook over the bottom cross bar of the lower fender section, whereby the two fender sections are held upright and in vertical alinement. The latch bar is provided with a handle 14 to facilitate its operation.

The two upper cross bars of the top fender section carry bearings 15 in which seats a downturned stem 16 at one end of a clothes-drying rod 17, said rod extending horizontally and being positioned in front of the fender so that clothes or other articles to be dried may be conveniently hung thereon. The stem 16 is free to turn in the bearings 15 so that the rod 17 may be swung back against the wall when not in use; or the stem can be lifted out of the bearings, and the rod laid away. The rod is offset from the stem so that it is spaced from the fender when in position for use.

At the top of the side bars 8 of the fender are outstanding fingers 18, which, when the fender is in position, engage the jambs or the wall in which the fireplace opening is made. The hinged ends of the fender sections abut squarely, so that the upper section can be swung downward in one direction only, the hinges 9 being positioned so that this swing is forwardly.

Fig. 3 shows a support 19 for supporting a teapot, kettle or other utensil, said support having a hook 20 so that it may be hung from one of the cross bars 7 of the fender.

By providing the fender with a hinged top section, said section may be swung downward, as shown in Fig. 2, after disengaging the latch 11, thus giving free access to the fireplace for replenishing the supply of wood or other fuel, and upon swinging the top section back to upright position, and locking the same by the latch, the fireplace is again closed up.

The fender seats removably in the lugs 10, and the entire structure may therefore be removed when not needed.

The fender bars 7 are uniformly spaced, in view of which the fender can be placed lower down on the arm 6 to bring it still closer to the floor.

I claim:—

1. The combination with a pair of fireplace andirons having upstanding arms, of clips carried by said arms, a fender having spaced cross bars, certain ones of said bars seating in the clips for supporting the fender in upright position, said fender being formed with upper and lower sections, the lower section being downwardly foldable, and a latch bar pivoted to one of the cross bars of one of the fender sections and having a part engageable with a cross bar of the other fender section for locking the foldable section in upright position.

2. The combination with a pair of fireplace andirons, of a fender carried thereby and having spaced cross bars, said fender being formed with upper and lower sections, the lower section being downwardly foldable, and a latch bar pivoted to one of the cross bars of one of the fender sections and having a part engageable with a cross bar of the other fender section for locking the foldable section in upright position.

In testimony whereof I affix my signature.

RUFUS M. PERRY.

Copies of this patent may be obtained for five cents each, by addressing the "Commissioner of Patents, Washington, D. C."